Figure 1:
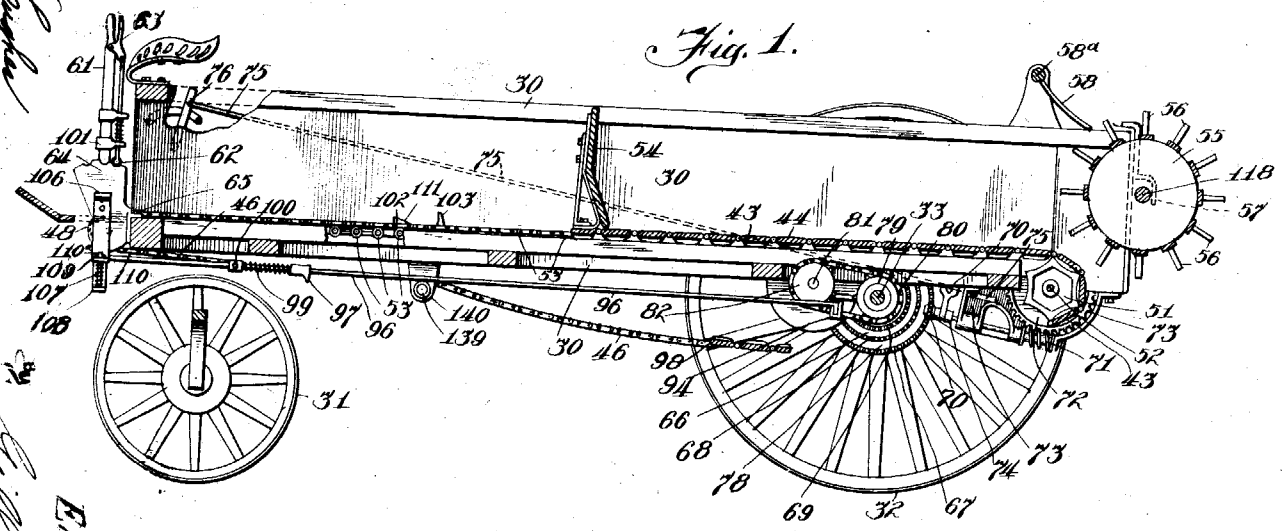

E. C. SMITH.

FERTILIZER DISTRIBUTER.

APPLICATION FILED OCT. 16, 1909.

Reissued Jan. 4, 1910.

13,071

6 SHEETS—SHEET 1.

Witnesses

Milton Lenoir

Daisy F. Hughes

Inventor

Ernest C. Smith.

By Gillson & Gillson

Attorneys.

E. C. SMITH.
FERTILIZER DISTRIBUTER.
APPLICATION FILED OCT. 16, 1909.
Reissued Jan. 4, 1910.
13,071.
6 SHEETS—SHEET 2.
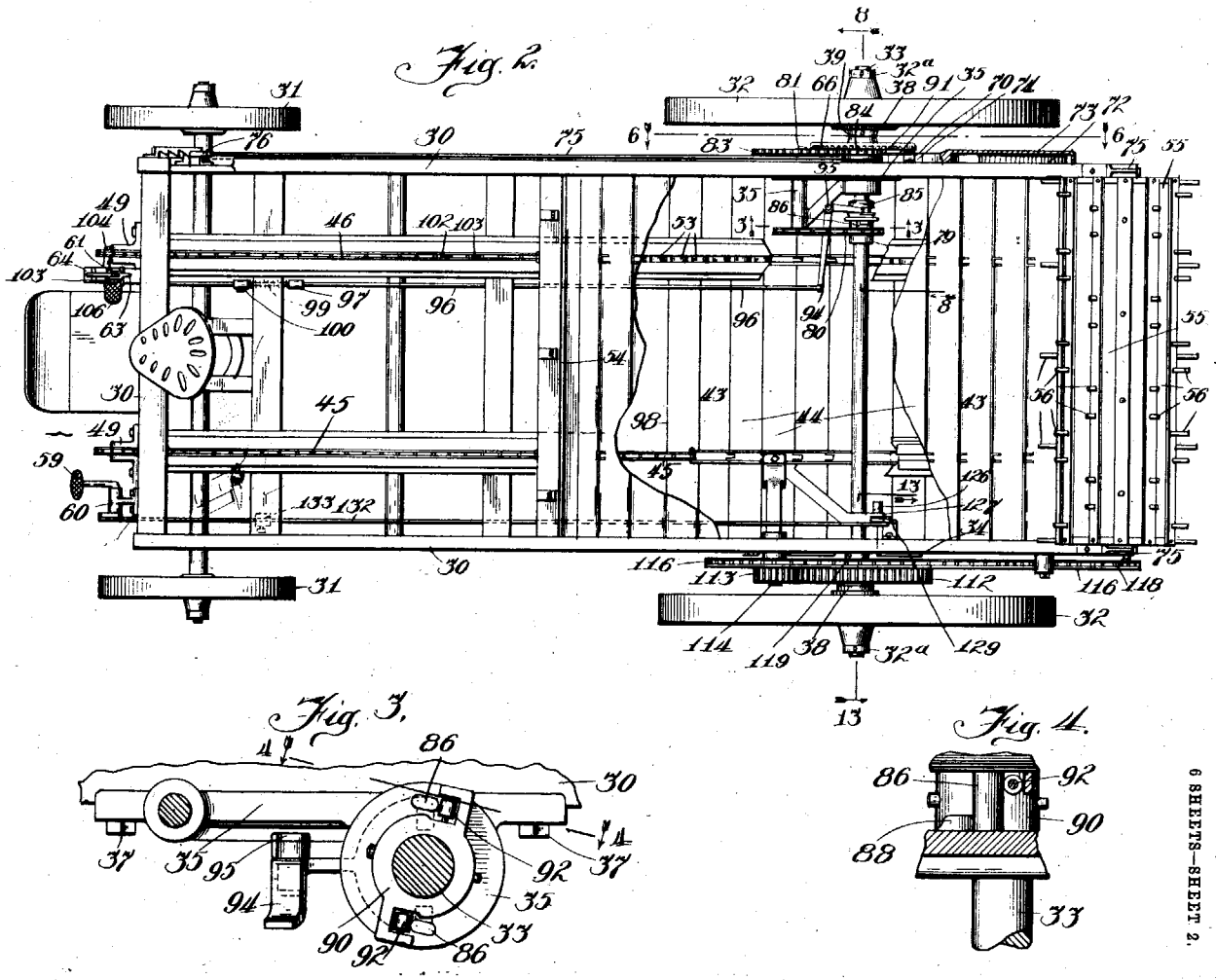
Witnesses
Milton Lenon
Daisy F. Hughes
Inventor
Ernest C. Smith.
By Gillson & Gillson
Attorneys.

E. C. SMITH.

FERTILIZER DISTRIBUTER.

APPLICATION FILED OCT. 16, 1909.

Reissued Jan. 4, 1910.

13,071.

6 SHEETS—SHEET 3.

Witnesses

Milton Lenoir

Daisy F. Hughes

Inventor

Ernest C. Smith, by Gillson & Gillson

Attorneys.

E. C. SMITH.

FERTILIZER DISTRIBUTER.

APPLICATION FILED OCT. 16, 1909.

Reissued Jan. 4, 1910.

13,071.

6 SHEETS—SHEET 4.

Witnesses

Milton Lenoir

Daisy F. Hughes

Inventor

Ernest C. Smith.

By Gillson & Gillson

Attorneys

E. C. SMITH.

FERTILIZER DISTRIBUTER.

APPLICATION FILED OCT. 16, 1909.

Reissued Jan. 4, 1910.

13,071.

6 SHEETS—SHEET 5.

Witnesses

Milton Lenir

Daisy F. Hughes

Inventor.

Ernest C. Smith.

By Gillson & Gillson,

Attorneys.

E. C. SMITH.

FERTILIZER DISTRIBUTER.

APPLICATION FILED OCT. 16, 1909.

Reissued Jan. 4, 1910.

13,071.

6 SHEETS—SHEET 6.

Witnesses

Milton Lenoir

Thos. F. Hughes

Inventor

Ernest C. Smith.

By Gillson & Gillson

Attorneys.

UNITED STATES PATENT OFFICE.

ERNEST C. SMITH, OF CANTON, ILLINOIS.

FERTILIZER-DISTRIBUTER.

13,071. Specification of Reissued Letters Patent. Reissued Jan. 4, 1910.

Original No. 930,098, dated August 3, 1909, Serial No. 287,718. Application for reissue filed October 16, 1909. Serial No. 523,085.

*To all whom it may concern:*

Be it known that I, ERNEST C. SMITH, a citizen of the United States, and resident of Canton, county of Fulton, and State of Illinois, have invented certain new and useful Improvements in Fertilizer-Distributers, of which the following is a specification, and which are illustrated in the accompanying drawings, forming a part thereof.

The invention relates to a fertilizer distributer of that type in which there is provided a suitable hopper mounted on wheels, and preferably having the general appearance of the ordinary farm wagon, a distributing mechanism located at the rear of the hopper for disintegrating the fertilizing material and scattering it over the ground, and a traveling apron forming the floor of the wagon for carrying the material contained within the hopper to the distributing mechanism.

More particularly, the invention relates to such a fertilizer distributer in which the traveling apron is carried by suitable endless chains and is moved out of the hopper as the materal is discharged, automatic means being provided for reversing the movement of the apron and causing it to return to the loading position when the hopper has been completely emptied.

In devices of this kind as usually made the distributing mechanism forms the only means for closing the discharge end of the hopper, and, during the operation of loading and driving to the field to be treated, the material becomes very tightly packed against this mechanism, so that it is started with great difficulty. To overcome this objectionable feature it has been found desirable to stop the apron for loading before it has reached the limit of its inward travel; then, just before the load is to be discharged the apron may be caused to complete its inward movement, thus carrying the material away from the distributing mechanism a short distance, so that the latter may be easily started. This method of operation has, however, been unreliable in view of the fact that it requires close attention of the driver to arrest the movement of the apron at the proper time.

One of the objects of the invention is, therefore, to provide automatic means for arresting the apron as just described, and improved manually-controlled shifting mechanism for starting the apron to complete its instroke and to begin its outward movement when it is desired to discharge the contents of the hopper.

Further objects of the invention are to provide improved means for reversing the movement of the apron when the limit of its outward movement has been reached, and to increase the efficiency and durability of devices of this kind.

The invention consists in the construction and arrangement of parts to be hereinafter described and claimed, and as illustrated in the accompanying drawings, in which—

Figure 5:
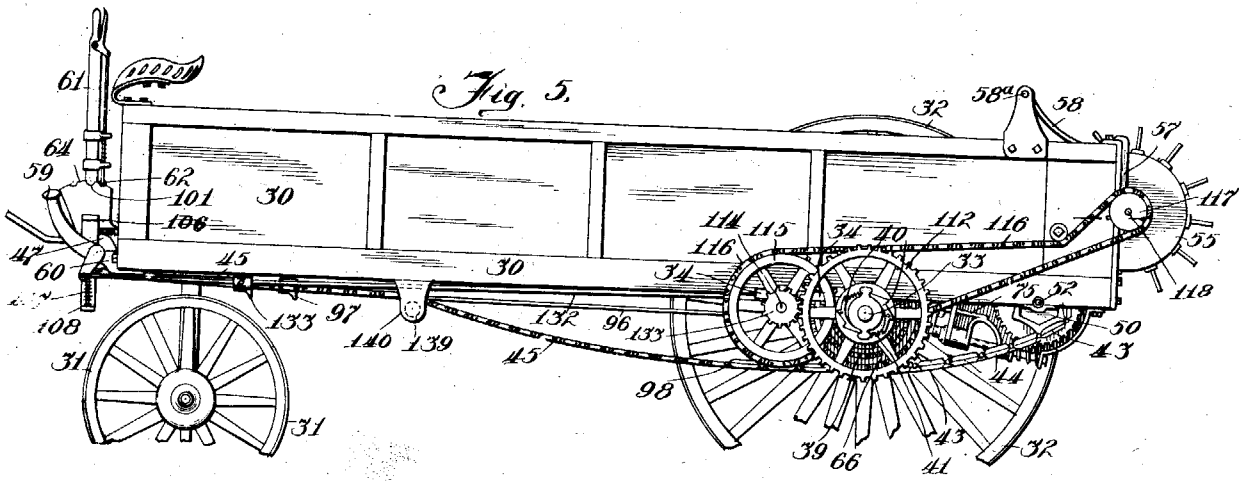
Figure 7:
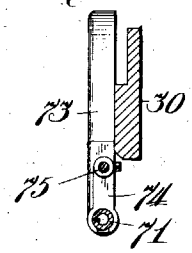
Figure 6:
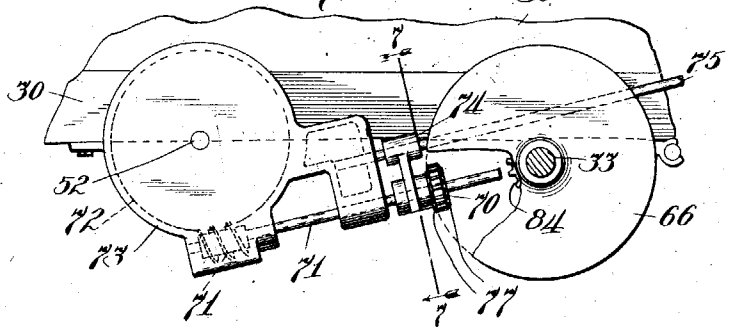
Figure 8:
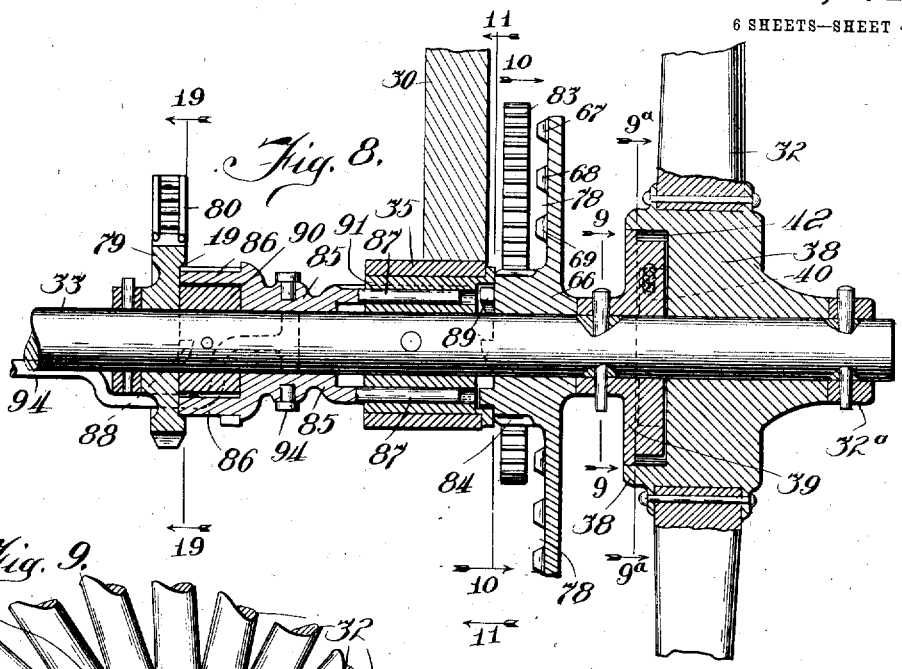
Figure 9:
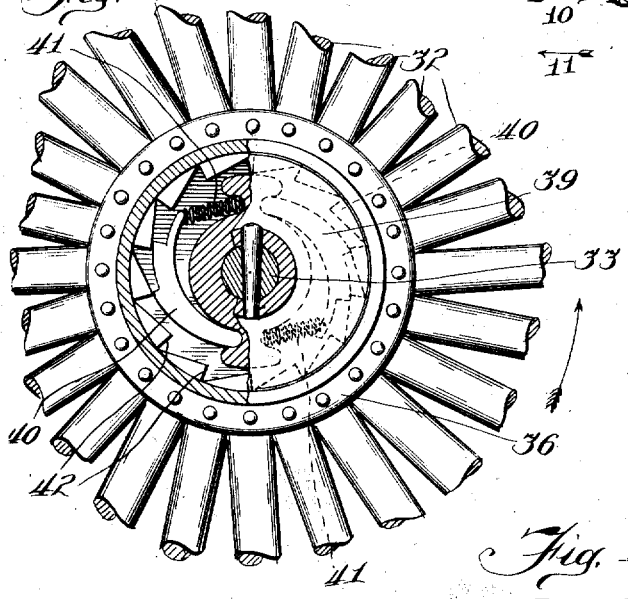
Figure 10:
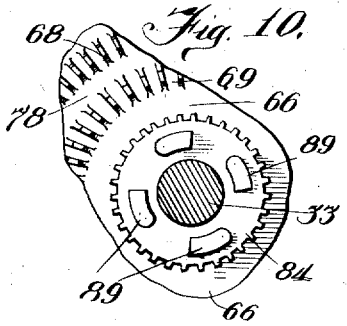
Figure 11:
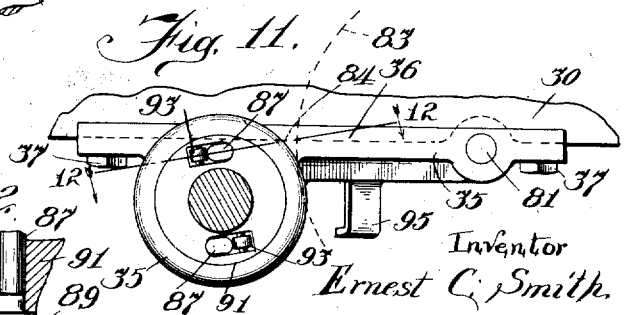
Figure 12:
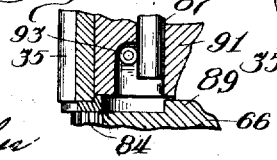
Figure 13:
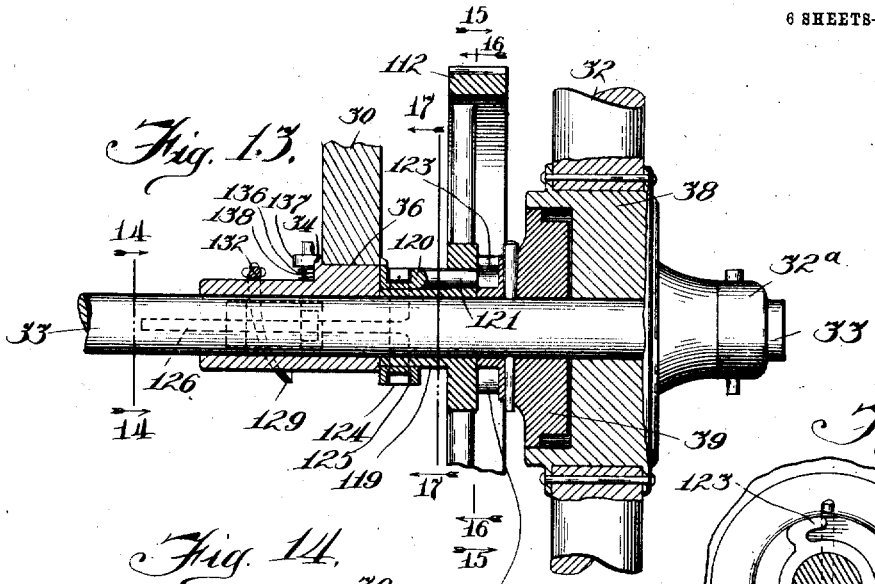
Figure 15:
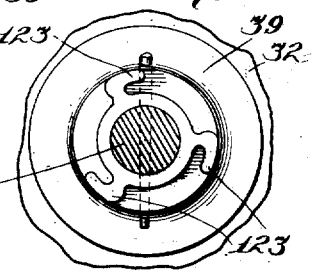
Figure 14:
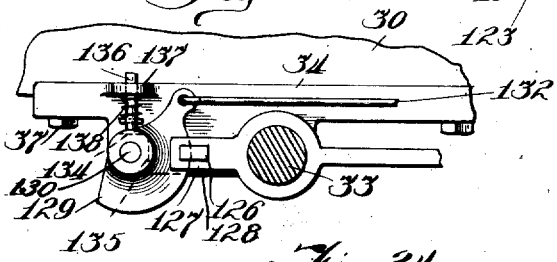
Figure 24:
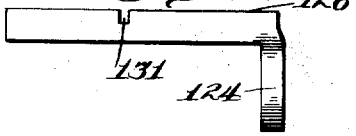
Figure 16:
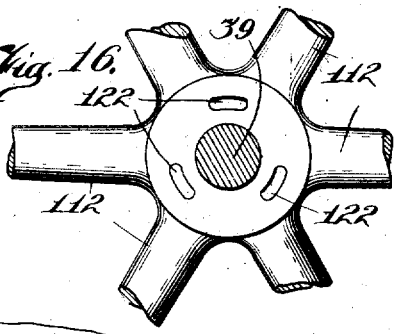
Figure 17:
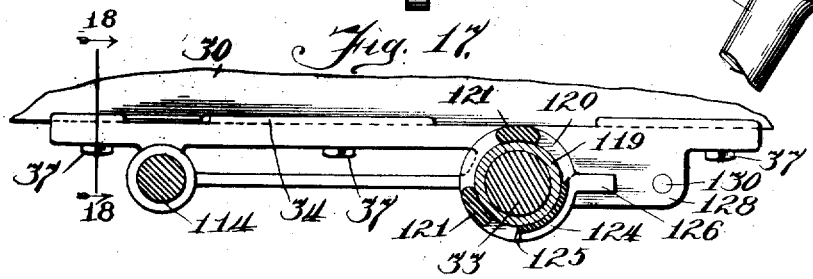
Figure 18:
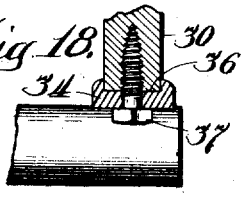
Figure 19:
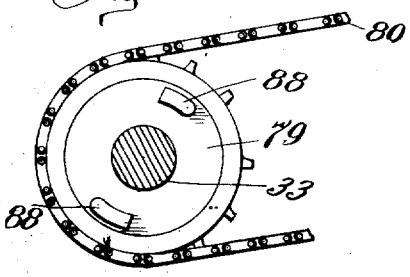
Figure 20:
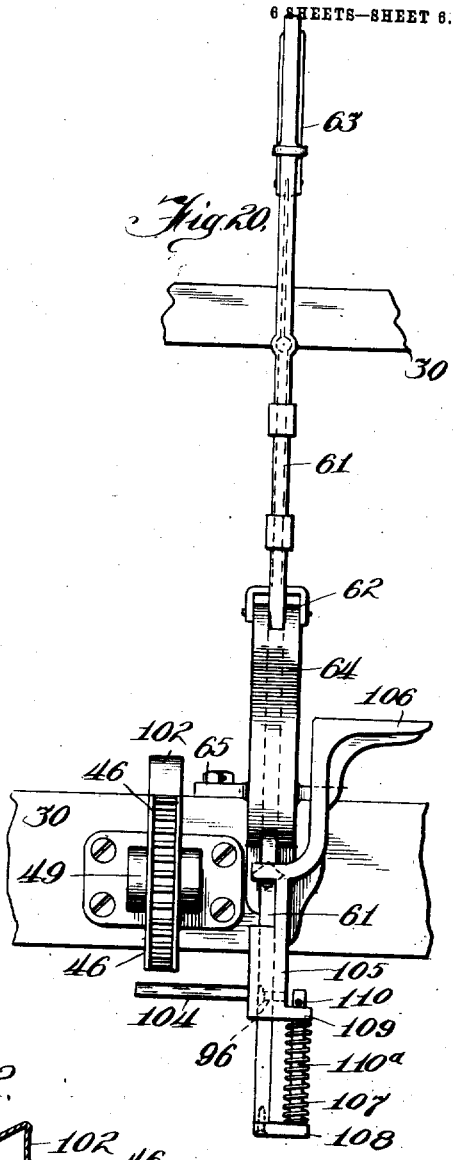
Figure 21:
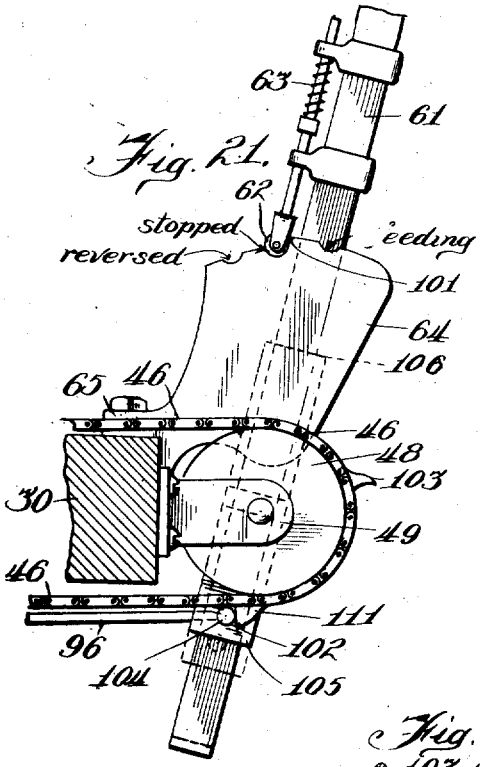
Figure 22:
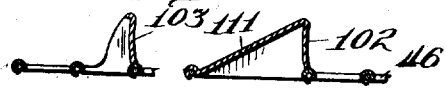
Figure 23:
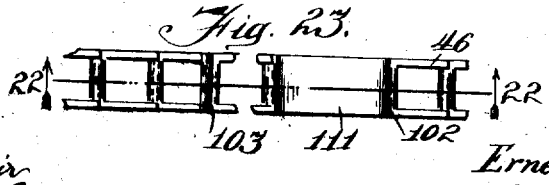

Figure 1 is a central longitudinal vertical section of the device, some of the parts being broken away; Fig. 2 is a plan view of the same, some of the parts being broken away; Fig. 3 is a detail vertical section on the line 3—3 of Fig. 2; Fig. 4 is a detail section on the line 4—4 of Fig. 3; Fig. 5 is a side elevation of the device, one of the carrying wheels being removed; Fig. 6 is a vertical section on the line 6—6 of Fig. 2; Fig. 7 is a sectional view on the line 7—7 of Fig. 6; Fig. 8 is a vertical transverse section on the line 8—8 of Fig. 2; Fig. 9 is a sectional view taken on the line 9—9 of Fig. 8, some of the parts being broken away to the plane indicated by the line $9^a$—$9^a$, Fig. 8; Figs. 10 and 11 are sectional views on the lines 10—10 and 11—11, respectively, of Fig. 8, some of the parts being shown in elevation in Fig. 10; Fig. 12 is a section on the line 12—12 of Fig. 11; Fig. 13 is a section on the line 13—13 of Fig. 2; Figs. 14, 15, 16 and 17 are sectional views on the lines 14—14, 15—15, 16—16 and 17—17, respectively, of Fig. 13; Fig. 18 is a sectional view on the line 18—18 of Fig. 17; Fig. 19 is a sectional view on the line 19—19 of Fig. 8; Fig. 20 is a detail front elevation of the device; Fig. 21 is a sectional view showing in side elevation some of the parts shown in Fig. 20, but illustrating them in a different position; Figs. 22 and 23 are sectional and plan views, respectively, showing in detail the construction of certain parts of a link belt used in the device; Fig. 24 is a detail plan view of a clutch shipper used in the device, separated from other parts.

A hopper 30, which will commonly be about the size and shape of a wagon body but without the usual ends or bottom, is supported by front and rear carrying wheels 31, 31 and 32, 32, respectively, the front wheels being mounted in any convenient manner, preferably like those of an ordinary wagon. The rear wheels, 32, are loosely mounted on the ends of a shaft 33 extending transversely beneath the hopper and journaled in suitable brackets 34 and 35. Each of these brackets is provided with a longitudinally extended bearing surface 36, upon which the side walls of the hopper rest, and are rigidly held in place, as by means of the lag screws 37 (Fig. 18). The rear carrying wheels are held in position on the shaft 33 by suitable collars 32[a] and, as shown in the drawings, both of these wheels drive the shaft, when rotated in a forward direction, by means of a ratchet hub mechanism 38. This mechanism is provided for each of the wheels 32 and may be of any desired construction; preferably it is such as is ordinarily used on agricultural machinery of various sorts, in which a rotating axle is employed for driving the moving parts, and is shown in Figs. 5, 8, 9 and 13. It comprises a pawl plate 39, pinned to the shaft just inside of the carrying wheel and provided with one or more pawl arms 40, each of which is advanced by a spring 41 to engage inwardly and forwardly directed ratchet teeth 42, formed within the hub of the wheel. A movable apron 43, substantially equal in length to that of the hopper 30 and composed of slats 44 mounted on endless chains 45, 46, forms the bottom of the hopper. The chains 45, 46, turn over sprocket wheels 47 and 48, journaled in brackets 49 at the forward end of the hopper, and at the rear of the hopper over sprockets 50 and 51, rigidly secured to a shaft 52, journaled in the frame of the device and adapted to be rotated in either direction to cause the apron to move into or out of the hopper. The upper turn of each of the chains 45 and 46 rest on a series of rollers 53, journaled in the frame members of the hopper, and the forward slat 44 of the apron 43 carries a suitable front board or follower 54 for preventing the contents of the hopper from falling over the end of the apron.

At the rear end of the hopper is the usual distributer or drum 55, journaled in brackets 57 secured to its walls. This drum is provided with radial fingers 56 for engaging the material to scatter it over the land, and extending over the hopper adjacent the distributing drum is a series of prongs 58 for aiding in its disintegration. The prongs 58 are mounted in a bar 58[a], secured by brackets to the walls of the hopper, and being of ordinary construction have been omitted from Fig. 2 of the drawings for the sake of clearness.

The distributer or drum 55 and the apron 43 are driven from the shaft 33, the mechanism for driving the distributer being shown in the drawings adjacent the left side of the hopper as viewed from the rear, that for driving the apron being at the right. Each of these mechanisms is adapted to be controlled in part by a driver occupying a seat adjacent the front end of the device. For so controlling the mechanism for driving the distributer a treadle 59, pivotally attached to the frame of the hopper by a bracket 60, is provided. This treadle is automatically raised to stop the distributer when the apron 43 reaches the limit of its outstroke, so that usually it will be employed by the attendant only to start the distributer, and for this purpose it is easily depressed by the foot.

A hand lever 61 is provided for controlling the mechanism for driving the apron. It carries a pawl 62, playing over a quadrant 64, to which the lever is pivoted and which is in turn secured to the frame of the machine by a bracket 65, formed integral with the quadrant. The pawl 62 preferably takes the form of a roller adapted to engage correspondingly rounded notches in the quadrant 64, out of which it may be raised by a spring-controlled grip piece 63 of ordinary construction. The lever 61 may be manually shifted to cause the apron to move in either direction, or to arrest its movement, and automatic means are provided for shifting the lever to reverse the movement of the apron when it has reached the limit of its outstroke and to stop it just short of the limit of its instroke and again at the end of that stroke.

For driving the apron a crown gear 66, having several sets of teeth, as 67, 68, 69, for obtaining different speeds, is loosely mounted on the shaft 33 and is adapted to be rotated with the shaft by means of a clutch mechanism, or to be rotated in the reverse direction at a greater speed by means of the clutch and suitable interposed gearing. A pinion 70, splined upon a worm shaft 71, meshes with the crown teeth of the gear 66, and through the worm shaft and a worm wheel 72 drives the shaft 52 for moving the apron. The worm shaft 71 is journaled in a bracket 73 secured to the frame of the machine, and so shaped as to form a casing or housing for the worm wheel 72. As most clearly shown in Figs. 6 and 7, the hub of the pinion 70 is engaged by a yoke 74 secured to a rod 75, which extends to the front of the machine where it is joined to a lever arm 76, by means of which it may be shifted to move the pinion into engagement with any one of the several sets of crown teeth on the gear 66. This pinion is preferably provided with a rounded form of teeth, as shown at 77, Fig. 6, of less width than the annular faces 78 of the gear 66, so that the pinion may be shifted from one set of teeth to the other while the device is in motion without danger of breakage. For driving the gear 66 in the opposite direction from which the shaft 33 turns to impart a reverse movement to the apron, a sprocket wheel 79 is loosely mounted on the shaft 33. By means of a chain 80 this sprocket wheel drives a countershaft 81, journaled in the bracket 35, and carrying a sprocket wheel 82 for receiving the chain, and a gear 83 which meshes with a pinion 84 formed integral with the crown gear 66.

A clutch member 85, most clearly shown in Fig. 8, plays between the gear 66 and the sprocket 79, and has at either end a set of engaging fingers 86, 86, and 87, 87, for engaging lugs 88 and 89, formed on the face of the sprocket and of the gear, respectively. This clutch member is loosely mounted on the shaft 33, but is caused to rotate with it by means of a dog rigidly secured to the shaft, preferably, though not necessarily, two such dogs, 90 and 91, being employed, one adjacent each end of the clutch member. With these dogs the clutch fingers 86, 87 have a sliding engagement. The dog 91 preferably takes the form of a sleeve, inclosing the shaft and turning in a bearing in the bracket 35, and it is cored out to receive the fingers 87. Preferably each of the dogs is provided with roller bearings 92, 93, for engaging the sides of the clutch fingers, to insure ease of operation when the clutch is shifted. A bell crank shipper 94, pivotally secured to a bearing 95 formed in the bracket 35, and connected to the lower end of the lever 61 by means of a rod 96, is provided for operating the clutch. The clutch member 85 is of such length that in its mid position it is not engaged with either the sprocket 79 or the gear 66, so that when in this position, which corresponds to the central position of the operating lever 61, shown in Fig. 21, the apron 43 will remain stationary. The clutch may, however, be shifted from one extreme position to the other to reverse the movement of the apron, and when the device is organized as shown in the drawings this is automatically effected when the apron has reached the limit of its outward movement by the following described means:—

A stop 97, loosely mounted on the rod 96, is adapted to be engaged by the advancing edge 98 of the apron 43 and bears upon a spring 99, coiled about the rod 96 and reacting upon a stop 100 fixed in position on the rod. Preferably the pawl 62 engages the rounded notches of the quadrant 64 with sufficient force to prevent the shifting of the lever 61 until the spring 99 has been considerably compressed by the advance of the apron. When, however, it becomes dislodged the expansion of the spring shifts the lever with such force that the pawl leaps over the central notch of the quadrant, and the clutch member is shifted from engagement with the gear 66 to the sprocket wheel 79, and the movement of the apron is reversed. An offset 101 in the quadrant 64 guards the central notch to assist in effecting this result.

For automatically stopping the apron before it reaches the limit of its return movement, there is provided on one of the supporting chains, as 46, an operating finger 102, preferably taking the form of a specially shaped chain link (Figs. 22 and 23). From the side of the lever 61 a pin 104 projects into the path of this finger and is adapted to be operatively engaged by it to shift the lever to arrest the movement of the apron. As illustrated, the lever occupies its central position when the movement of the apron has been arrested, and in Fig. 21 is shown the position of the parts immediately after the lever has been shifted to this position, as just described. From an inspection of this figure it will be readily understood that in order to shift the lever to cause the apron to complete its inward movement (the lever then occupying a rearward position, as shown) the pin 104 must be shifted to clear the engaging finger 102. For this reason the pin 104 is movably attached to the lever 61, preferably being formed integral with a sleeve 105 having a sliding engagement with the lever. The pin is normally supported in the path of the finger 102 by means of a spring 107 reacting between an overturned foot 108 of the lever 61 and a lug 109 projecting from the sleeve 105, the upward movement of the sleeve being limited by a pin 110, set through a rod 110ª about which the spring is coiled, and engaged by the lug 109. As shown the sleeve 105 is provided with a treadle 106, by means of which it may be depressed against the effort of the spring 107, and when so moved to the dotted lines position of Fig. 21 the lever 61 may be manually returned to its rearward position to start the apron. Preferably the apron is again automatically stopped at the end of its inward movement by a second operating finger 103, formed on the chain 46, for engaging the pin 104. The outward movement of the apron is started, when the device is constructed as shown in the drawings, by manually shifting the lever 61 until the pawl 62 engages the forward notch of the quadrant 64, and in order that the finger 102 may ride over the pin 104 as the apron moves out, this finger is provided with an inclined face 111 which engages the pin by a cam action to depress it.

The mechanism for driving the distributer or drum 55 may be of any desired form, preferably a gear 112 is loosely mounted on the shaft 33 for this purpose and may be caused to rotate with it by means of a clutch mechanism, as will be hereinafter described.

This gear meshes with a pinion 113, mounted on a stub shaft 114 set in the bracket 34, and which has formed integral with it a sprocket 115, over which turns a chain 116, leading to a similar sprocket 117 on the end of the beater shaft 118. The clutch mechanism for connecting the gear 112 with the shaft 33 is illustrated in Figs. 13 to 17, inclusive, and in Fig. 24, and is constructed as follows:—The gear 112 is provided with a long hub 119, upon which is slidingly mounted a clutch member, preferably taking the form of a sleeve 120, having longitudinally extending fingers 121, which reach through apertures 122 in the body of the gear and may, by shifting the sleeve, be caused to move into or out of engagement with lugs 123 formed on the back of one of the pawl plates 39. For shifting the sleeve 120 on the hub 119 a yoke 124 engaging a groove 125 in the sleeve is provided, and an arm 126 (Fig. 24) extends at right angles from the yoke, and takes a bearing in wings 127, 128, in the bracket 34. This arm is adapted to be reciprocated to shift the sleeve by a cam 129, turning on a stub shaft 130 secured to the bracket 34, and engaging a notch 131 in the arm. The cam 129 is connected by a rod 132 with the operating treadle 59, previously described, and upon this rod a stop 133 is secured to be engaged by the advancing edge 98 of the outwardly moving apron to raise the treadle and disengage the clutch sleeve 120 when the contents of the hopper 30 have been completely discharged. To prevent the accidental turning of the cam 129 its hub is flattened, as indicated at 134 and 135, and against this flattened portion a pin 136, playing through an aperture in a lug 137 in the bracket 34, is yieldingly depressed by a spring 138.

The lower turn of the chains 45 and 46 carrying the apron 43 are supported by a rod 139, extending beneath the hopper 30 and secured thereto by brackets 140, this rod being provided to cause the chains to clear the carrying wheels 31 when the device is being turned about and to guide the apron against the stops 97 and 133.

The operation of the device is as follows:—The hopper 30 is filled with material to be distributed over the land when the traveling apron 43 is a few inches from the end of its return movement, the apron having been stopped in this position by contact of the operating finger 102 on the chain 46, with the pin 104, shifting the lever 61 to its central position, as illustrated in Fig. 21, the clutch member 85 occupying the corresponding position in which it is disengaged from both the sprocket 79 and the gear 66. As the device is drawn forward the rear axle or driving shaft 33 is rotated from the carrying wheels 23 by means of the ratchet hub mechanism 38, and when the field to be treated has been reached the lever 61 will be manually drawn to its rearward or upright position, the sleeve 105 being first depressed to the dotted line position of Fig. 21 by pressure upon the treadle 106 to permit the pin 104 to clear the finger 102. This movement of the lever 61 engages the clutch member 85 with the sprocket wheel 79, so that the crown gear 66, which drives the apron through the medium of the worm shaft 71 and worm wheel 72, is turned in the opposite direction from the driving shaft 33, and the apron 43 with its load will be drawn away from the distributer 55. This movement, however, will be interrupted as soon as the apron has reached the limit of its instroke by contact of the finger 103 with the pin 104, which shifts the lever 61 back to its central position. The distributer 55 being now entirely free from the material, may be started by depressing the treadle 59, which rotates the cam 129 to the left, as viewed in Fig. 14, and causes the clutch 120 to engage the lugs 123 of the continuously rotating pawl plate 39. As soon as the distributer 55 has been started, the attendant will start the outward movement of the apron 43 by throwing the lever 61 to its extreme forward position, causing the clutch member 85 to engage the lugs 89 on the face of the gear 66, and the gear to rotate with the driving shaft 33 and move the apron, with its load, toward the distributer. When the entire contents of the hopper have been discharged the advancing edge 98 of the apron will have reached the stops 97 and 133, the spring 99 will have been compressed and the rods 96 and 132 thrown forward. The forward movement of the rod 132 raises the treadle 59 and disengages the clutch sleeve 120 from the lugs 123 on the pawl plate 39, so that the distributer will be stopped. The forward movement of the rod 96, however, aided by the effort of the spring 99 will throw the lever 61 to its other extreme or rearward position, and the clutch member 85 will become engaged with the sprocket wheel 79, causing the apron 43 to be drawn back into the hopper. Near the end of the instroke of the apron its movement will be interrupted by contact of the finger 102 with the pin 104, which shifts the lever 61 to the central position. The device is now ready for reloading, after which the cycle of operations just described may be repeated.

To secure successful operation of the automatic mechanism for reversing the movement of the apron it has been found desirable, though not essential, to employ a clutch as shown in which the movable parts are not splined to the shaft, as has heretofore been the usual form of construction of clutches of that kind, the frictional resistance to the movement of the clutching member being greatly reduced by the use of the dogs 90 and 91, as shown.

I claim as my invention:—

1. In a fertilizer distributer, in combination, a hopper, a carrying wheel for the hopper, a reciprocating bottom for the hopper, means for actuating the hopper bottom from the carrying wheel, a clutch for controlling the actuating means, a lever for shifting the clutch, a stop moving with the hopper-bottom and an appurtenance of the lever projecting into the path of the stop and intermediate of the ends of movement thereof, the stop being adapted to operatively engage such appurtenance in one direction of movement only and to pass the said appurtenance after such operative engagement.

2. In a fertilizer distributer, in combination, a hopper, a carrying wheel for the hopper, a movable bottom for the hopper, means for actuating the hopper-bottom from the carrying wheel, a clutch for controlling the actuating means, a lever for shifting the clutch, a stop moving with the hopper-bottom, a pin movably secured to the lever and normally extending into the path of the stop, and means for moving the pin on the lever.

3. In a fertilizer distributer, in combination, a hopper, a carrying wheel for the hopper, a movable bottom for the hopper, means for actuating the hopper-bottom from the carrying wheel, a clutch for controlling the actuating means, a lever for shifting the clutch, a stop moving with the hopper-bottom, a sleeve slidably inclosing the lever and carrying a pin projecting into the path of the stop, a spring for supporting the sleeve, and a foot-piece carried by the sleeve.

4. In a fertilizer distributer, in combination, a hopper, a carrying wheel for the hopper, a movable bottom for the hopper, means for actuating the hopper-bottom from the carrying wheel, a clutch for controlling the actuating means, a lever for shifting the clutch, a stop moving with the hopper-bottom and having an abrupt forward face and an inclined rearward face, and a sleeve slidably inclosing the lever and carrying a pin normally projecting into the path of the stop.

5. In a fertilizer distributer, in combination, a hopper, a carrying wheel, a rotating axle driven by the carrying wheel, a movable bottom for the hopper, two gears loosely mounted on the axle, suitable gearing for communicating motion in opposite directions from such gears to the hopper-bottom, a clutch rotating with the axle and playing between the gears and adapted when in its mid position to be disengaged from both, an operating lever, a pawl for yieldingly retaining the lever, a stop engaged by the moving hopper-bottom, and a spring connecting the stop and the lever.

6. In a fertilizer distributer, in combination, a hopper, a carrying wheel, a rotating axle driven by the carrying wheel, a movable bottom for the hopper, two gears loosely mounted on the axle, suitable gearing for communicating motion in opposite directions from such gears to the hopper-bottom, a clutch rotating with the axle and playing between the gears and adapted when in its mid position to be disengaged from both, a lever, connection between the lever and the clutch, a quadrant fixed in position adjacent the lever, a pawl carried by the lever and yieldingly engaging the quadrant, and a yielding trip for throwing the lever and adapted to be engaged by the hopper-bottom.

7. In a fertilizer distributer, in combination, a pair of side sills, a hopper mounted thereon, distributing mechanism, and feed mechanism for unloading the hopper, a bracket bolted to one of the sills, a rotating axle, carrying wheels mounted thereon, a bushing fixed against rotation on the axle and journaled in the bracket, a variable speed gear having clutch teeth loosely mounted on the axle outside of the sills and adjacent the bushing, connection between the variable speed gear and the feed mechanism, a shiftable clutch member mounted on the axle between the sills and having clutch prongs extending through the bushing, means for shifting the clutch member, and means for driving the distributing mechanism.

8. In a fertilizer distributer, in combination, a hopper, a movable bottom for the hopper, mechanism for driving the hopper bottom including a rotating part and a movable clutch member adapted to engage and be disengaged from such part, clutch-shifting means comprising a hand lever and connection between the hand lever and the movable clutch member, a quadrant having rounded notches, a spring-advanced roller pawl carried by the hand lever for engaging the rounded notches of the quadrant to yieldingly maintain the hand lever in adjusted position, and a contact-piece adapted for engagement by the hopper bottom carried by the clutch-shifting means.

9. In a fertilizer distributer, in combination, a hopper, a movable bottom for the hopper, mechanism for driving the hopper bottom including a rotating part and a movable clutch member adapted to engage and be disengaged from such part, clutch-shifting means comprising a hand lever and connection between the hand lever and the movable clutch member, a quadrant, a pawl carried by the hand lever for engaging the quadrant to yieldingly maintain the hand lever in adjusted position, and a yielding contact-piece adapted for engagement by the hopper bottom carried by the clutch-shifting means.

10. In a fertilizer distributer, in combination, a hopper, a movable bottom for the hopper, mechanism for driving the hopper bottom including a rotating part and a movable clutch member adapted to engage and be disengaged from such part, clutch-shifting means comprising a hand lever, and connection between the hand lever and the movable clutch member, a spring latch for maintaining the hand lever in that adjusted position, wherein the movable clutch member is engaged with the rotating part and a contact-piece adapted to be moved by the hopper bottom to release the said latch and shift the movable clutch member.

11. In combination, a shaft, two wheels loose on the shaft, mechanism driven by one of the wheels, operative connection between the wheels whereby they rotate simultaneously in opposite directions, a clutch driven by the shaft and engaging the wheels in alternation, a manually-controlled shipper rod joined to the clutch and a spring-supported stop sliding on the rod and lying in the path of a movable part of the mechanism.

12. In combination, a shaft, two wheels loose on the shaft, mechanism driven by one of the wheels, operative connection between the wheels whereby they rotate simultaneously in opposite directions, a clutch driven by the shaft and engaging the wheels in alternation, a manually-controlled shipper member for shifting the clutch and having a yieldingly supported contact-piece lying in the path of the movable part of the mechanism.

13. In combination, a shaft, two wheels loose on the shaft, mechanism driven by one of the wheels, operative connection between the wheels whereby they rotate simultaneously in opposite directions, a clutch driven by the shaft and engaging the wheels in alternation and adapted when in its mid position to be disengaged from both, a manually-controlled shipper member for shifting the clutch and having a yieldingly-supported contact-piece lying in the path of a movable part of the mechanism.

14. In a fertilizer distributer, in combination, a hopper, a movable bottom for the hopper, mechanism for driving the hopper bottom including a rotating part and a movable clutch member adapted to engage and be disengaged from such part, clutch shifting means comprising a hand lever and connection between the hand lever and the movable clutch member, a latch for maintaining the hand lever in that adjusted position wherein the movable clutch member is engaged with the rotating part, and mechanism actuated by the hopper bottom for releasing the said latch and moving the hand lever.

15. In a fertilizer distributer, in combination, a hopper, a movable bottom for the hopper, mechanism for driving the hopper bottom including a rotating part and a movable clutch member adapted to engage and be disengaged from such part, a quadrant, mechanism for shifting the movable clutch member including a hand lever and a pawl carried by the hand lever and coöperating with the quadrant, and a contact piece adapted for engagement by the hopper bottom for raising the pawl and moving the hand lever.

ERNEST C. SMITH.

Witnesses:
W. F. MOORE,
FRED SINGLETON.